United States Patent
Lee et al.

(10) Patent No.: US 8,345,739 B2
(45) Date of Patent: Jan. 1, 2013

(54) METHOD, MEDIUM, AND APPARATUS CONTROLLING BIT RATE IN IMAGE DATA ENCODING

(75) Inventors: Sangjo Lee, Suwon-si (KR); Wooshik Kim, Yongin-si (KR); Daesung Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1812 days.

(21) Appl. No.: 11/335,608

(22) Filed: Jan. 20, 2006

(65) Prior Publication Data

US 2006/0164268 A1 Jul. 27, 2006

(30) Foreign Application Priority Data

Jan. 21, 2005 (KR) ........................ 10-2005-0005814

(51) Int. Cl.
*H04B 1/66* (2006.01)
(52) U.S. Cl. ......... 375/240; 704/500; 382/276; 382/232
(58) Field of Classification Search .................. 375/240; 704/500; 382/276, 232
See application file for complete search history.

(56) References Cited

U.S. PATENT DOCUMENTS 5,844,611 A * 12/1998 Hamano et al. ............ 375/240.2
2002/0021754 A1 * 2/2002 Pian et al. ................ 375/240.02
2002/0172283 A1 * 11/2002 Kawakatsu et al. ...... 375/240.13

FOREIGN PATENT DOCUMENTS

KR    10-2003-0083109    10/2003

OTHER PUBLICATIONS

Korean Office Action issued on May 26, 2006 in Korean Patent Application No. 10-2004-0005814.

* cited by examiner

*Primary Examiner* — Zewdu Kassa
(74) *Attorney, Agent, or Firm* — Staas & Halsey LLP

(57) ABSTRACT

A method, medium, and apparatus controlling a bit rate in image data encoding. The method for controlling a bit rate in image data encoding includes setting a reference bit amount for encoding a block group composed of a predetermined number of blocks created by dividing image data of a frame, encoding pixel values of the blocks according to a bit depth used to quantize the pixel values of the blocks, checking whether encoding of the frame is completed, and comparing a group bit amount indicating the amount of encoded bits of the block group with the set reference bit amount to adjust the bit depth if encoding of the unit frame is not completed and accordingly repeating the setting of the reference bit amount, encoding pixel values of the blocks, and checking whether encoding of the frame is completed.

24 Claims, 6 Drawing Sheets

METHOD, MEDIUM, AND APPARATUS CONTROLLING BIT RATE IN IMAGE DATA ENCODING

CROSS-REFERENCE TO RELATED APPLICATIONS

This application claims the priority benefit of Korean Patent Application No. 10-2005-0005814, filed on Jan. 21, 2005, in the Korean Intellectual Property Office, the disclosure of which is incorporated herein in its entirety by reference.

BACKGROUND OF THE INVENTION

1. Field of the Invention

Embodiments of the present invention, as discussed herein, relate to image data encoding, and more particularly, to a method, medium, and apparatus controlling a bit rate in image data encoding to encode image data of a frame according to a predetermined bit rate.

2. Description of the Related Art

When image data is conventionally encoded, a frame unit is divided into blocks of a predetermined size and the blocks are transformed and quantized to produce a bitstream. To adjust the amount of bits of the bitstream for the blocks, a bit rate is controlled.

However, when image data is conventionally encoded, it is difficult to accurately produce a bitstream for each frame. In other words, under buffer-constrained bit rate control, rough bit rate control is possible, while accurate bit rate control is difficult.

Because of the difficulties of accurate bit rate control, the amount of bits stored in a buffer that temporarily stores an encoded bitstream significantly changes according to image data and a garbage bit is frequently inserted to maintain the amount of bits output from the buffer and transmitted to a memory constant, and in effect, precluding the buffer from efficiently performing its function.

SUMMARY OF THE INVENTION

Embodiments of the present invention at least provide a method, medium, and apparatus controlling a bit rate in image data encoding, making it possible to produce a fixed size bitstream.

To achieve the above and/or other aspects and advantages, embodiments of the present invention include at least a method for controlling a bit rate in image data encoding, the method including setting a reference bit amount for encoding a block group having a predetermined number of blocks created by dividing image data of a frame, encoding pixel values of the blocks according to a bit depth used to quantize the pixel values of the blocks, determining whether encoding of the frame is completed, and comparing a group bit amount indicating an amount of encoded bits of the block group with the set reference bit amount to adjust a bit depth if encoding of a unit frame is not completed and to accordingly repeat the setting of the reference bit amount for encoding the block group having the predetermined number of blocks created by dividing image data of the frame.

The repeating of the setting of the reference bit amount for encoding the block group having the predetermined number of blocks created by dividing image data of the frame further include the encoding of the pixel values of the blocks according to the bit depth used to quantize the pixel values of the blocks, and the determining of whether the encoding of the frame is completed.

In the setting of the reference bit amount, the reference bit amount is set using $B_R = (B_S - B_C)/(G_S - G_C)$, where $B_R$ indicates the reference bit amount, $B_S$ indicates a total bit amount assigned to the frame, $B_C$ indicates an amount of encoded bits in the frame, $G_S$ indicates a total number of block groups making up the frame, and $G_C$ indicates a number of encoded block groups in the frame.

The blocks are one-dimensional and the block group is a line.

The encoding of the pixel values of the blocks includes encoding pixel values of a block included in the blocks of the block group using the bit depth, determining whether encoding of the block group is completed, and adjusting the bit depth according to a bitstream storage state of a buffer that temporarily stores an encoded bitstream of the block group if encoding of the block group is not completed and accordingly repeating the encoding of the pixel values of the block included in the blocks of the block group using the bit depth, the determining of whether the encoding of the block group is completed, and the adjusting of the bit depth.

In addition, the adjusting of the bit depth includes determining whether an amount of bits stored in the buffer exceeds a threshold amount of the buffer, and skipping encoding of a neighboring block of the block when the amount of bits stored in the buffer exceeds the threshold amount.

The adjusting of the bit depth includes determining whether the amount of bits stored in the buffer exceeds an upper allowable amount of the buffer when the amount of bits stored in the buffer does not exceed the threshold amount, and reducing the bit depth when the amount of bits stored in the buffer exceeds the upper allowable amount.

The adjusting of the bit depth similarly includes determining whether the amount of bits stored in the buffer is less than a lower allowable amount of the buffer when the amount of bits stored in the buffer does not exceed the upper allowable amount in the reducing of the bit depth when the amount of bits stored in the buffer exceeds the upper allowable amount, and increasing the bit depth when the amount of bits stored in the buffer is less than the lower allowable amount.

Here, the comparing of the group bit amount indicating the amount of encoded bits of the block group with the set reference bit amount includes determining whether the group bit amount exceeds the reference bit amount, and reducing the bit depth when the group bit amount exceeds the reference bit amount.

Further, the comparing of the group bit amount indicating the amount of encoded bits of the block group with the set reference bit amount includes determining whether a result of multiplying the group bit amount by a variable is less than the reference bit amount when the group bit amount does not exceed the reference bit amount in the reducing of the bit depth when the group bit amount exceeds the reference bit amount, and increasing the bit depth when the result of the multiplication is less than the reference bit amount.

The comparing of the group bit amount indicating the amount of encoded bits of the block group with the set reference bit amount includes detecting a bitstream storage status of a buffer that temporarily stores an encoded bitstream of the block group, and adjusting the variable according to the bitstream storage state of the buffer and accordingly repeating the determining of whether the group bit amount exceeds the reference bit amount.

Further, the comparing of the group bit amount indicating the amount of encoded bits of the block group with the set reference bit amount includes adjusting the bit depth according to the bitstream storage state of the buffer after the adjusting of the variable according to the bitstream storage state of the buffer and accordingly repeating the determining of whether the group bit amount exceeds the reference bit amount.

To achieve the above and/or other aspects and advantages, embodiments of the present invention include at least an apparatus controlling a bit rate in image data encoding, the apparatus including an encoding unit to encode pixel values of blocks created by dividing image data of a frame according to a bit depth used for quantization of the pixel values of the blocks, a buffer to temporarily store an encoded bitstream of the blocks, a reference bit amount setting unit to set a reference bit amount for encoding a block group having a predetermined number of blocks, an encoding completion checking unit to determine whether encoding of the frame is completed, and a bit depth adjustment controller to compare a group bit amount indicating an amount of encoded bits of the block group with the set reference bit amount, in response to the determination result of the encoding completion checking unit, and to accordingly adjust the bit depth.

The reference bit amount setting unit set the reference bit amount using $B_R = (B_S - B_C)/(G_S - G_C)$, where $B_R$ indicates the reference bit amount, $B_S$ indicates a total bit amount assigned to the frame, $B_C$ indicates an amount of encoded bits in the frame, $G_S$ indicates a total number of block groups making up the frame, and $G_C$ indicates a number of encoded block groups in the frame.

The blocks are one-dimensional and the block group is a line.

In addition, the encoding completion checking unit determines whether encoding of the block group is completed.

Further, the bit depth adjustment controller includes a bit amount comparing unit to compare the group bit amount with the reference bit amount to determine whether the group bit amount exceeds the reference bit amount, and a bit depth adjusting unit to adjust the bit depth based on a result of the comparison performed by the bit amount comparing unit.

Here, the bit depth adjustment controller further includes a buffer bit amount detecting unit to detect an amount of bits stored in the buffer, and a variable adjusting unit to adjust a variable by which a group bit amount is to be multiplied based on a result of the detection performed by the buffer bit amount detecting unit.

The bit depth adjusting unit adjusts the bit depth based on the result of the detection performed by the buffer bit amount detecting unit.

In addition, the bit depth adjustment controller adjusts the bit depth according to a bitstream storage state of the buffer.

Here, the bit depth adjustment controller includes a buffer bit amount detecting unit to detect an amount of bits stored in the buffer, an encoding skip instructing unit to instruct the encoding unit to skip encoding of a neighboring block of a current block upon receiving the detection result, indicating the amount of bits stored in the buffer exceeds a threshold amount of the buffer, from the buffer bit amount detecting unit, and a bit depth adjusting unit to reduce the bit depth upon receiving the detection result, indicating the amount of bits stored in the buffer exceeds an upper allowable amount of the buffer, from the buffer bit amount detecting unit, and to increase the bit depth upon receiving the detection result indicating the amount of bits stored in the buffer is less than a lower allowable amount of the buffer.

To achieve the above and/or other aspects and advantages, embodiments of the present invention include at least at least one medium including computer readable code to implement embodiments of the present invention.

Additional aspects and/or advantages of the invention will be set forth in part in the description which follows and, in part, will be apparent from the description, or be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
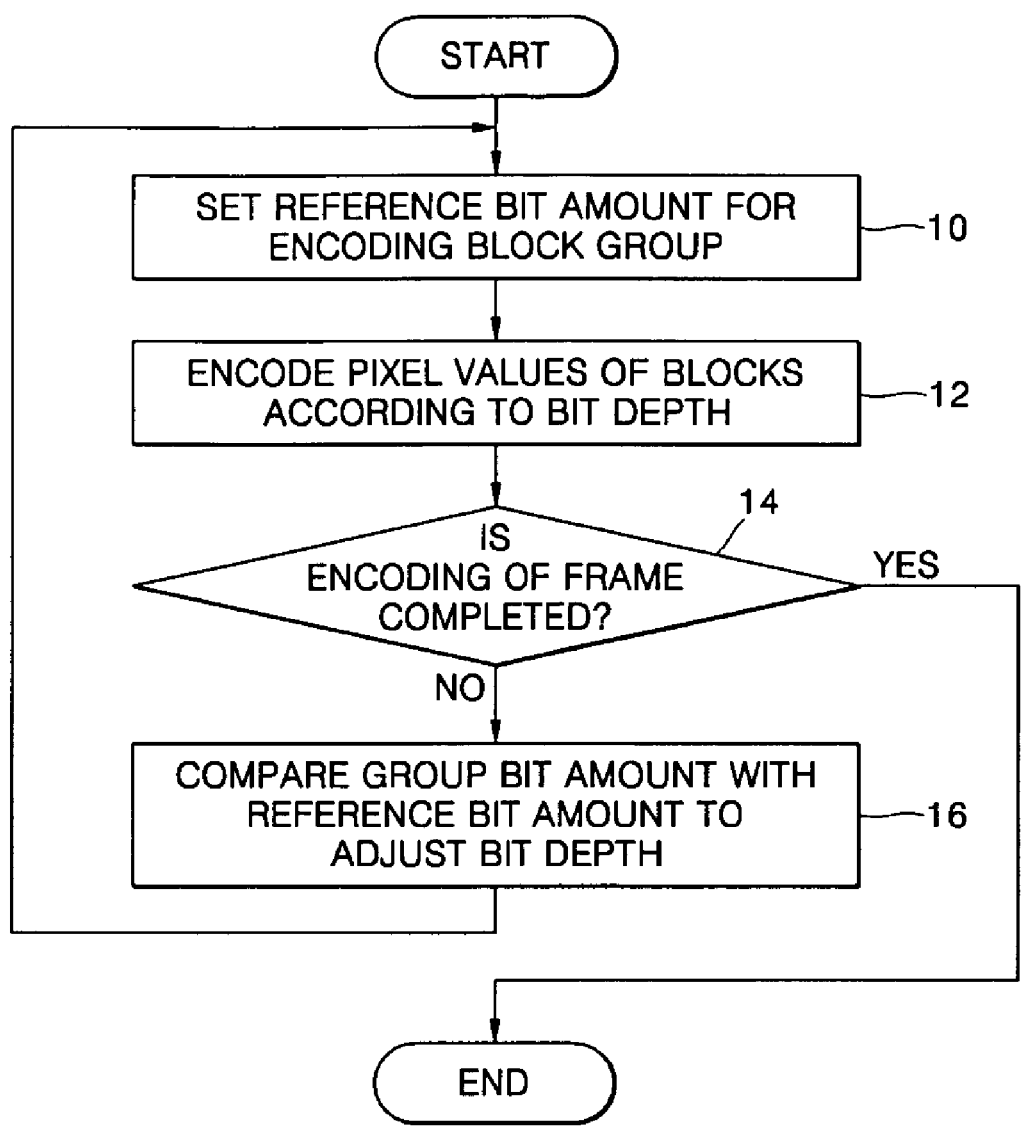
FIG. 1 illustrates a method for controlling a bit rate in image data encoding, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

Accordingly, FIG. 1 illustrates a method for controlling a bit rate in image data encoding, according to an embodiment of the present invention.

As illustrated in FIG. 1, when image data of a frame is divided into block units, a reference bit amount for encoding a block group having a predetermined number of blocks is set, in operation 10. For example, when a frame is divided into one-dimensional blocks (e.g., 4×1 blocks or 8×1 blocks), a line made up of a predetermined number of one-dimensional blocks is designated as a block group. In this way, a frame is constructed of line-based block groups. A block group also is composed of two-dimensional blocks (e.g., 4×4 blocks or 8×8 blocks).

Here, for solely simplification purposes, description will now be made based on an assumption that a block group is a line made up of one-dimensional blocks.

The reference bit amount is set using the following Equation 1.

$$B_R = (B_S - B_C)/(G_S - G_C) \quad (1),$$

Here, $B_R$ indicates a reference bit amount, $B_S$ indicates a total bit amount assigned to a frame, $B_C$ indicates the amount of encoded bits in a frame, $G_S$ indicates the total number of block groups making up a frame, and $G_C$ indicates the number of encoded block groups in a frame.

As only an example, when a line is designated as a block group, a total bit amount assigned to a frame is 10000 bits, the amount of encoded bits in the frame is 4500 bits, the total number of block groups making up the frame, i.e., the total number of lines, is 100, and the number of encoded block groups in the frame, i.e., the number of encoded lines, be 50, such that a reference bit amount is obtained as "(10000−4500)/(100−50)=100" using the above Equation 1. The obtained reference bit amount, thus, is used as a reference bit amount for encoding image data in units of a block group, i.e., a line, in a following operation.

In operation 10, pixel values of the blocks are encoded according to a bit depth used for quantization of the pixel values of the blocks, in operation 12.

Figure 2:
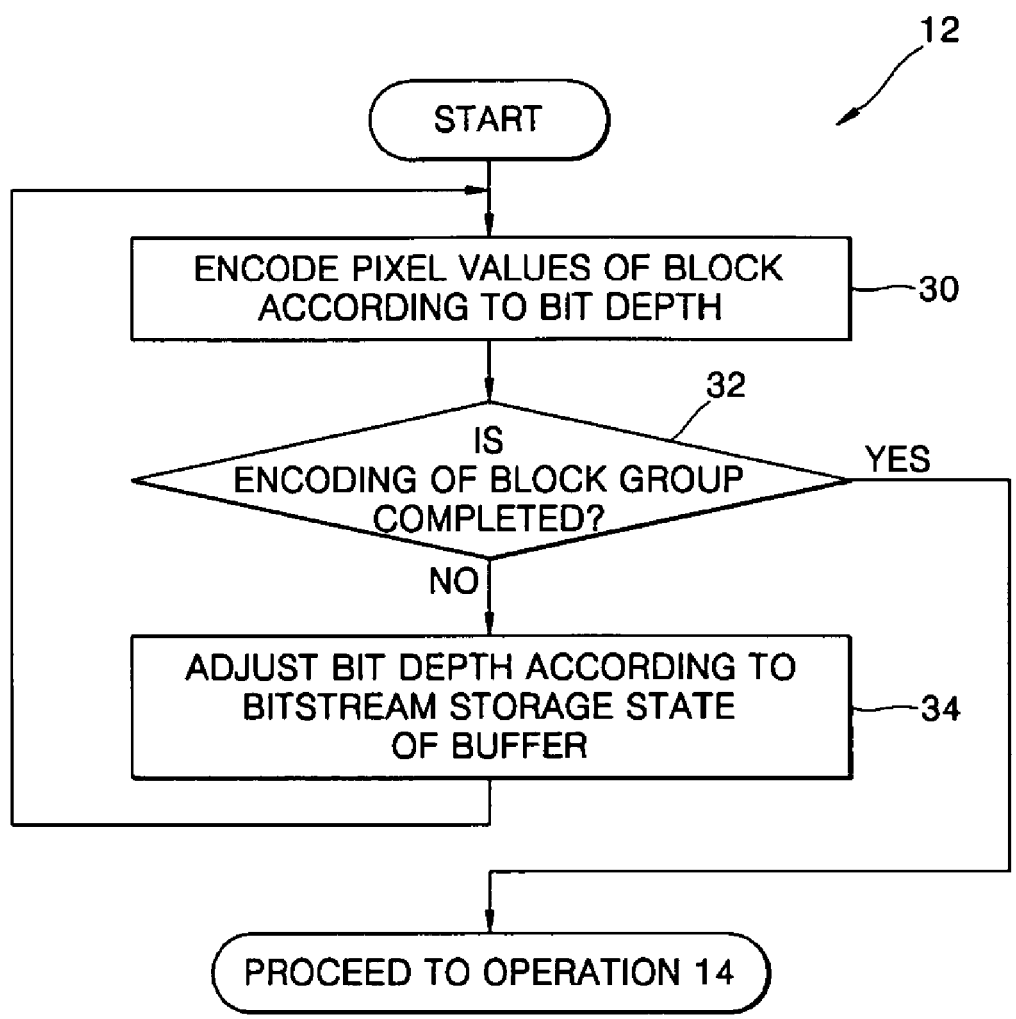
FIG. 2 illustrates an operation according to an embodiment of the present invention, such as that of operation 12 shown in FIG. 1.

According to an embodiment of the present invention, FIG. 2 illustrates operation 12 of FIG. 1 in greater detail.

In operation 30, pixel values of one of the blocks included in a block group are encoded using a bit depth.

Whether encoding of the block group has been completed can be confirmed in operation 32. Completion of encoding of the block group means that encoding of the blocks included in the block group is completed. Thus, if encoding of the block group is completed, process continues through operation 14 of FIG. 1.

If encoding of the block group has not completed, a bit depth is adjusted according to a bitstream storage state of a buffer that temporarily stores an encoded bitstream of the block group, in operation 34 of FIG. 2, for example, and the process repeats to operation 30 of FIG. 2, for example. Incompletion of encoding of the block group means that there exists at least one block that has not been encoded among the blocks included in the block group. Thus, in operation 34, a bit depth used for encoding a block that is not encoded is adjusted. After adjustment of the bit depth in operation 34, the process repeats to operation 30 of FIG. 2, for example, to encode the block that has not been encoded according to the adjusted bit depth, adjusted in operation 34. The buffer temporarily stores an encoded bitstream and output the temporarily stored bitstream to a memory in predetermined units, for example.

Figure 3:
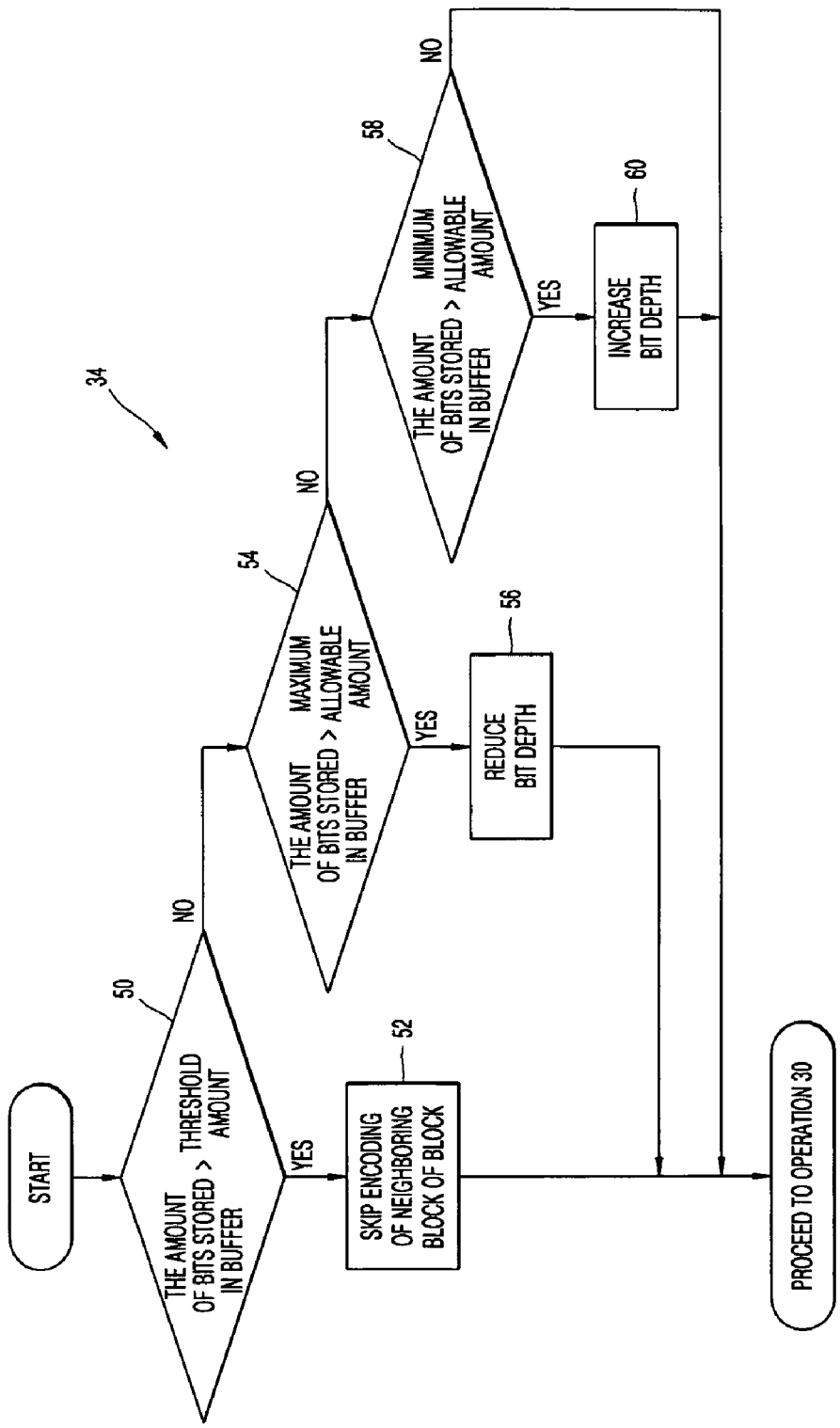
FIG. 3 illustrates another operation according to an embodiment of the present invention, such as that of operation 34 shown in FIG. 2.

FIG. 3 illustrates an operation according to an embodiment of the present invention, such as that of operation 34 shown in FIG. 2.

As illustrated in FIG. 1, in operation 50, whether the amount of bits stored in the buffer exceeds a threshold amount of the buffer is determined. The threshold amount of the buffer indicates a maximum allowable amount that can be stored in the buffer. Excess over the threshold amount, e.g., excess over the maximum allowable amount, means that an encoded bitstream is not stored in the buffer.

Here, if the amount of bits stored in the buffer exceeds the threshold amount, a neighboring block of a block is not encoded, in operation 52. Since an encoded bitstream is not stored in the buffer when the threshold amount, e.g., the maximum allowable amount, is exceeded, a neighboring next block of an encoded current block is not encoded. Since the next block is not encoded, a bitstream for the next block is not created. Thus, the case of where a bitstream created through encoding of the next block is stored in the buffer does not occur.

However, when the amount of bits stored in the buffer does not exceed the threshold amount, in operation 50, whether the amount of bits stored in the buffer exceeds an upper allowable amount of the buffer can be determined, in operation 54. The upper allowable amount of the buffer indicates an upper limit to allow the buffer to output, e.g., to a memory, an encoded bitstream having a predetermined size, which is temporarily stored in the buffer.

When the amount of bits stored in the buffer exceeds the upper allowable amount, the bit depth is reduced, in operation 56. The excess amount of bits stored in the buffer over the upper allowable amount means that the amount of bits of a created bitstream exceeds a proper bit amount required to allow the buffer to output, e.g., to a memory, an encoded bitstream having a predetermined size. At this time, to reduce the amount of bits of a bitstream to be encoded, the bit depth is reduced.

However, when the amount of bits stored in the buffer does not exceed the upper allowable amount, in operation 54, whether the amount of bits stored in the buffer is less than a lower allowable amount of the buffer is determined, in operation 58. The lower allowable amount of the buffer indicates a lower limit to allow the buffer to output, e.g., to the memory, an encoded bitstream having a predetermined size, which is temporarily stored in the buffer, without adding a garbage bit to the encoded bitstream.

When the amount of bits stored in the buffer is less than the lower allowable amount, the bit depth is increased, in operation 60. The amount of bits stored in the buffer, which is less than the lower allowable amount, means that the amount of bits of a created bitstream is less than the proper bit amount required to allow the buffer to output, e.g., to a memory, an encoded bitstream having a predetermined size. At this time, to increase the amount of bits of a bitstream to be encoded, the bit depth is increased.

Again, referring to FIG. 1, after operation 12, whether encoding of a frame has been completed can be determined in operation 14. Completion of encoding of the frame means that encoding of the block groups (e.g., all the lines included in the frame when the block group is a line) included in the frame has been completed.

When the encoding of the frame is not completed, a group bit amount indicating the amount of encoded bits of the block group and the reference bit amount is compared to adjust a bit depth, in operation 16, and the process repeats to operation 10. Incompletion of encoding of the unit frame means that there exists at least one block group that has not been encoded among the block groups included in the unit frame. Thus, in operation 16, the bit depth used for encoding the block groups that have not been encoded is adjusted. After adjustment of the bit depth, in operation 16, the process repeats to operation 10 to encode the block groups that were not encoded, according to the adjusted bit depth, adjusted in operation 16.

For example, when a block group is a line, the group bit amount of the block group indicates a total bit amount of an encoded bitstream of the line.

Figure 4:
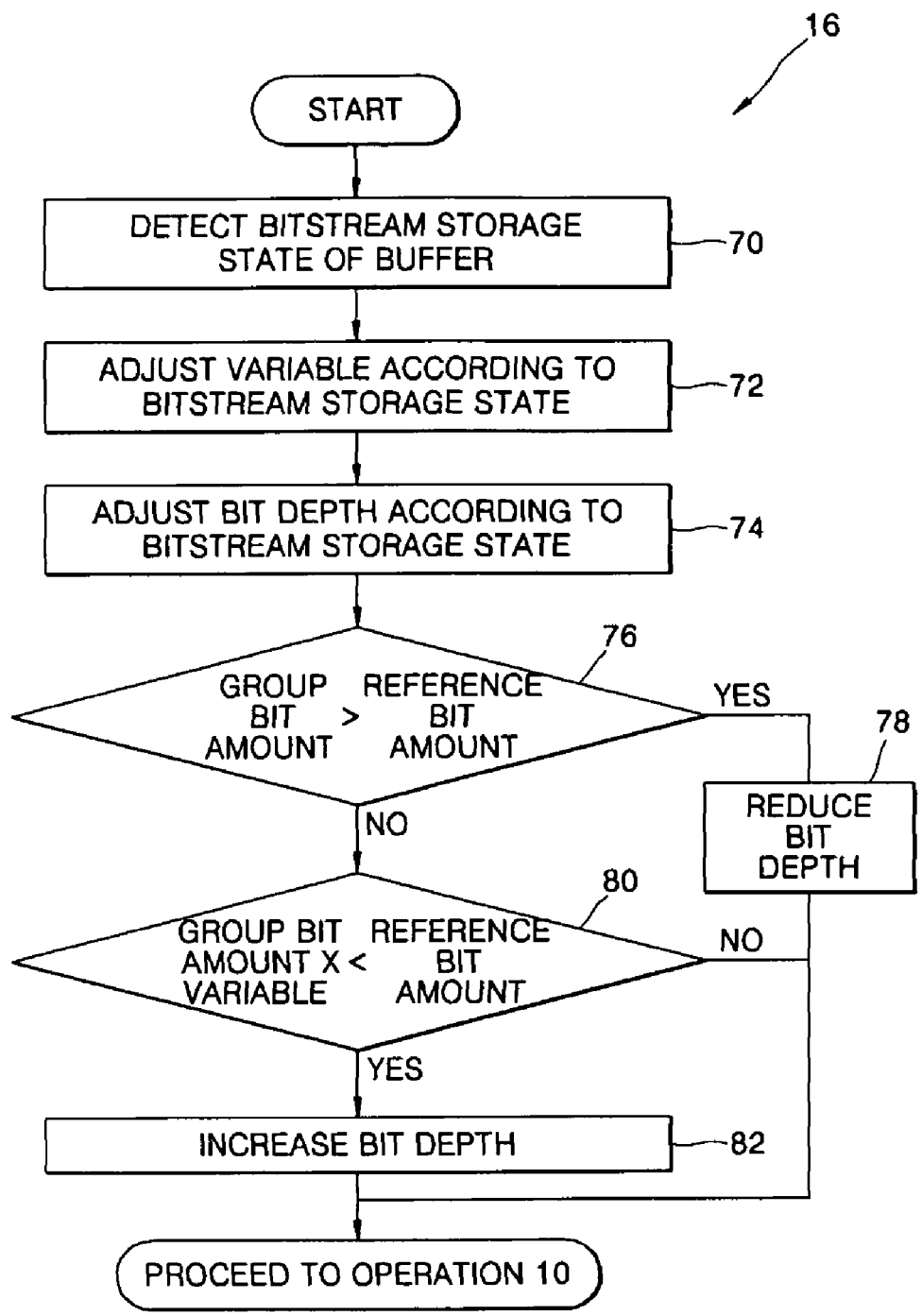
FIG. 4 illustrating still another operation according to an embodiment of the present invention, such as that of operation 16 shown in FIG. 1.

FIG. 4 illustrates an operation according to an embodiment of the present invention, such as that of operation 16 shown in FIG. 1.

In operation 70, a bitstream storage state of the buffer that temporarily stores an encoded bitstream of a block group is detected. For example, whether the amount of bits stored in the buffer exceeds the upper allowable amount or is less than the lower allowable amount can be determined.

A variable by which a group bit amount is to be multiplied is adjusted according to the bitstream storage state of the buffer, in operation 72. For example, since the excess amount of bits stored in the buffer over the upper allowable amount means that the amount of bits of a created bitstream exceeds a proper bit amount required to allow the buffer to output, e.g., to a memory, an encoded bitstream having a predetermined size, the variable is increased. Also, since the amount of bits stored in the buffer, which is less than the lower allowable amount, indicates that the amount of bits of a created bitstream is less than the proper bit amount, the variable is reduced.

The bit depth is increased or reduced according to the bitstream storage state of the buffer, in operation 74. For example, since the excess amount of bits stored in the buffer over a predetermined amount that is larger than the upper allowable amount means that the amount of bits of a created bitstream exceeds a proper bit amount required to allow the buffer to output, e.g., to a memory, an encoded bitstream having a predetermined size, the bit depth is reduced to reduce the amount of bits of a bitstream to be encoded. Also, since the amount of bits stored in the buffer, which is less than a predetermined amount that is smaller than the lower allowable amount, indicates that the amount of bits of a created bitstream is less than the proper bit amount, the bit depth is increased to increase the amount of bits of a bitstream to be encoded.

Whether the group bit amount exceeds the reference bit amount is determined in operation 76.

When the group bit amount exceeds the reference bit amount, the bit depth is reduced, in operation 78. The excess group bit amount over the reference bit amount indicates that the actual amount of bits of an encoded bitstream of a block group exceeds the reference bit amount. Thus, since the amount of bits of a bitstream to be encoded needs to be reduced, the bit depth is reduced.

However, when the group bit amount does not exceed the reference bit amount, in operation 76, the group bit amount is multiplied by the adjusted variable, adjusted in operation 72, and whether a result of the multiplication is less than the reference bit amount be determined in operation 80.

When the multiplication of the variable results in less than the reference bit amount, the bit depth is increased, in operation 82. The multiplication result, less than the reference bit amount, indicates that the amount of bits of an encoded block group is too small. Thus, since the amount of bits of a bitstream to be encoded needs to be increased, the bit depth used for encoding is increased.

Figure 5:
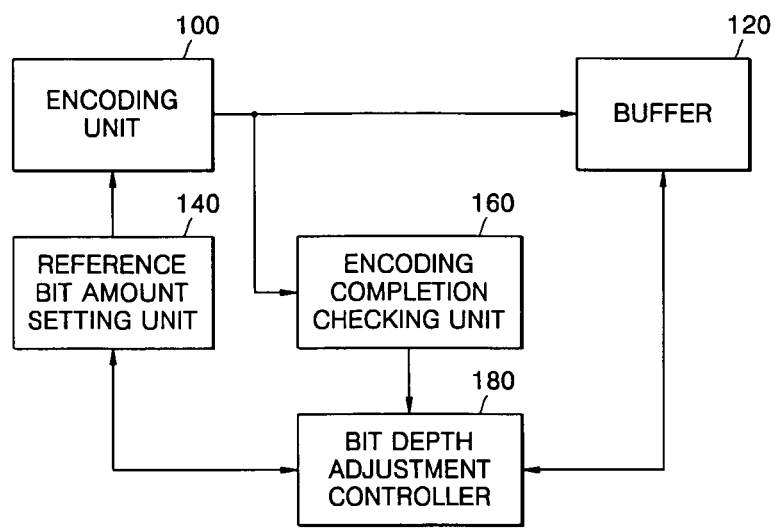
FIG. 5 illustrates an apparatus controlling a bit rate in image data encoding, according to an embodiment of the present invention.

FIG. 5 further illustrates an apparatus controlling a bit rate in image data, encoding according to an embodiment of the present invention. The apparatus controlling a bit rate in image data encoding, according to this embodiment of the present invention, includes an encoding unit 100, a buffer 120, a reference bit amount setting unit 140, an encoding completion checking unit 160, and a bit depth adjusting controller 180, for example.

When image data of a unit frame is divided into blocks, the encoding unit 100 encodes pixel values of the blocks according to a bit depth used to quantize the pixel values of the blocks.

The encoding unit 100 encodes pixel values of a line that is a block group, composed of one-dimensional blocks created by dividing the frame, according to the bit depth.

A result of encoding, performed by the encoding unit 100, is output to the buffer 120 and the encoding completion checking unit 160, for example.

The buffer 120 temporarily stores a bitstream encoded by the encoding unit 100 and output the temporarily stored bitstream to a memory (not shown).

The reference bit amount setting unit 140 sets a reference bit amount for encoding a block group made up of a predetermined number of blocks. The reference bit amount set by the reference bit amount setting unit 140 is output to the bit depth adjusting controller 180, e.g., at the request of the bit depth adjusting controller 180.

The reference bit amount setting unit 140 sets the reference bit amount, e.g., using the aforementioned Equation 1. As in the above example, when a line is designated as a block group, a total bit amount assigned to a frame is 10000 bits, the amount of encoded bits in the frame is 4500 bits, the total number of block groups making up the frame, i.e., the total number of lines, is 100, and the number of encoded block groups in the frame, i.e., the number of encoded lines, is 50, such that the reference bit amount setting unit 140 obtains a reference bit amount of "(10000−4500)/(100−50)=100" using Equation 1.

The encoding completion checking unit 160 determines whether encoding of the frame has been completed in response to a result of encoding performed by the encoding unit 100, for example, and output the determination result to the bit depth adjusting controller 180. Completion of encoding of the frame means that encoding of the block groups (e.g., all the lines included in the frame when the block group is a line) included in the frame is completed.

The encoding completion checking unit 160 determines whether encoding of a block group is completed in response to a result of encoding performed by the encoding unit 100, for example, and output the determination result to the bit depth adjusting controller 180. Completion of encoding of the block group means that encoding of the blocks included in the block group is completed, e.g., encoding of all of the blocks of the block group is completed.

The bit depth adjusting controller 180 compares a group bit amount indicating an amount of encoded bits of a block group with the set reference bit amount in response to a determination result of the encoding completion checking unit 160 to adjust a bit depth.

Figure 6:
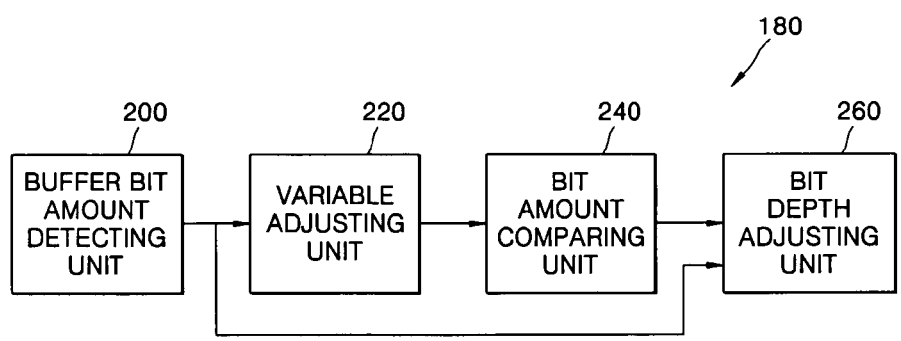
FIG. 6 illustrates a bit depth adjusting controller, such as that shown in FIG. 5, according to an embodiment of the present invention.

FIG. 6 illustrates a bit depth adjusting controller 180, such as that shown in FIG. 5, according to an embodiment of the present invention. The bit depth adjusting controller 180, according to this embodiment of the present invention, includes a buffer bit amount detecting unit 200, a variable adjusting unit 220, a bit amount comparing unit 240, and a bit depth adjusting unit 260, for example.

The buffer bit amount detecting unit 200 detects the amount of bits stored in the buffer and output a result of the detection to the variable adjusting unit 220 and the bit depth adjusting unit 260. For example, the buffer bit amount detecting unit 200 detects whether the amount of bits stored in the buffer exceeds an upper allowable amount or is less than a lower allowable amount.

The variable adjusting unit 220 adjusts a variable by which a group bit amount is to be multiplied in response to the detection result of the buffer bit amount detection unit 200. For example, the excess amount of bits stored in the buffer over the upper allowable amount indicates that the amount of bits of a created bitstream exceeds a proper bit amount required to allow the buffer 120 to output, e.g., to a memory, an encoded bitstream having a predetermined size. Thus, the variable adjusting unit 220 increases the variable by which the group bit amount is to be multiplied. The amount of bits stored in the buffer 120, which is less than the lower allowable amount, indicates that the amount of bits of a created bitstream is less than the proper bit amount. Thus, the variable adjust unit 220 reduces the variable by which the group bit amount is to be multiplied.

The bit amount comparing unit 240 determines whether the group bit amount exceeds the reference bit amount and output the determination result to the bit depth adjusting unit 260.

The bit depth adjusting unit 260 adjusts a bit depth in response to a result of the group bit determination performed by the bit amount comparing unit 240. Upon receiving the determination result indicating that the group bit amount exceeds the reference bit amount, from the bit amount comparing unit 240, the bit depth adjusting unit 260 reduces the bit depth.

However, upon receiving the result of the group bit determination indicating that the group bit amount does not exceed the reference bit amount, from the bit amount comparing unit 240, the bit depth adjusting unit 260 determines whether a result of the multiplying of the group bit amount by the variable adjusted by the variable adjusting unit 220 is less than the reference bit amount. When the result of multiplying the group bit amount by the variable is less than the reference bit amount, the bit depth adjusting unit 260 increases the bit depth used for encoding.

The bit depth adjusting unit 260 adjusts the bit depth in response to the determination result of the buffer bit amount detection unit 200. For example, the excessive amount of bits stored in the buffer 120 over a predetermined amount that is larger than the upper allowable amount indicates that the amount of bits of a created bitstream exceeds the a proper bit amount required to allow the buffer 120 to output, e.g., to a memory, an encoded bitstream having a predetermined size, the bit depth adjusting unit 260 reduces the bit depth to reduce the amount of bits of a bitstream to be encoded. Since the amount of bits stored in the buffer, which is less than the lower allowable amount, means that the amount of bits of a created bitstream is less than the proper bit amount required to allow the buffer 120 to output, e.g., to a memory, an encoded bitstream having a predetermined size, the bit depth adjusting unit 260 increases the bit depth to increase the amount of bits of a bitstream to be encoded.

Figure 7:
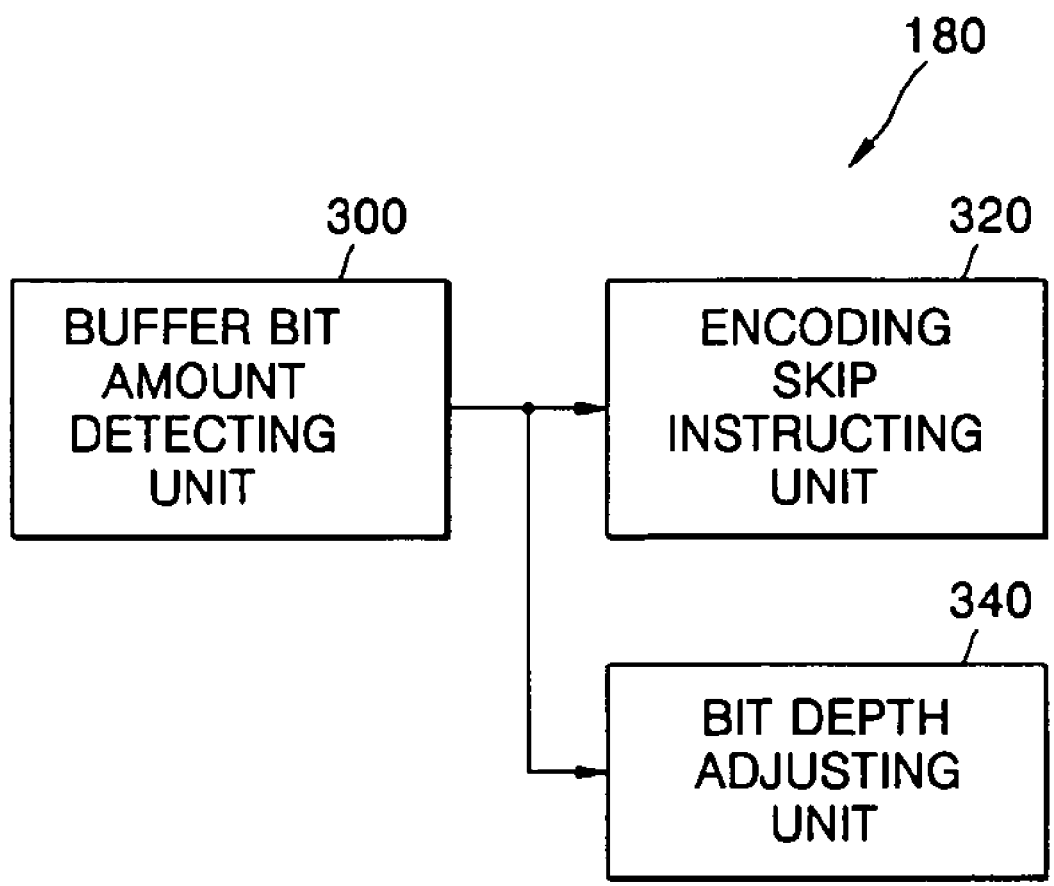
FIG. 7 illustrates another bit depth adjusting controller, such as that shown in FIG. 5, according to another embodiment of the present invention.

FIG. 7 illustrates another bit depth adjusting controller 180, such as that shown in FIG. 5, according to another embodiment of the present invention. The bit depth adjusting controller 180, according to this embodiment of the present invention, includes a buffer bit amount detecting unit 300, an encoding skip instructing unit 320, and a bit depth adjusting unit 340, for example.

The buffer bit amount detecting unit 300 detects the amount of bits stored in the buffer 120 and output the detection result to the encoding skip instructing unit 320 and the bit depth adjusting unit 340. For example, the buffer bit amount detecting unit 300 detects whether the amount of bits stored in the buffer 120 exceeds a threshold amount or an upper allowable amount or is less than a lower allowable amount.

Upon receiving the detection result indicating the amount of bits stored in the buffer 120 exceeds the threshold amount from the bit amount detecting unit 300, the encoding skip instructing unit 320 instructs the encoding unit 100 to skip encoding of a neighboring block of a current block. The excessive amount over the maximum allowable amount that can be stored in the buffer 120, i.e., the threshold amount, means that a bitstream to be encoded is not stored in the buffer 120. Thus, the encoding skip instructing unit 320 instructs the encoding unit 100 to skip encoding of a neighboring next block of a current block that is encoded.

Upon receiving the detection result indicating the amount of bits stored in the buffer 120 exceeds the maximum allowable amount of the buffer 120, from the buffer bit amount detecting unit 320, the bit depth adjusting unit 340 reduces the bit depth. Upon receiving the detection result indicating the amount of bits stored in the buffer 120 is less than the minimum allowable amount of the buffer 120, from the buffer bit amount detecting unit 320, the bit depth adjusting unit 340 increases the bit stream.

The excessive amount of the amount of bits stored in the buffer 120 over the upper allowable amount indicates that the amount of bits of a created bitstream exceeds a proper bit amount required to allow the buffer 120 to output, e.g., to a memory, an encoded bitstream having a predetermined size. Thus, the bit depth adjusting unit 340 reduces the bit depth to reduce the amount of bits of a bitstream to be encoded.

The amount of bits stored in the buffer 120, which is less than the lower allowable amount, indicates that the amount of bits of a created bitstream is less than the proper bit amount required to allow the buffer 120 to output, e.g., to a memory, an encoded bitstream having a predetermined size. Thus, the bit depth adjusting unit 340 increases the bit depth to increase the amount of bits of a bitstream to be encoded.

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The media also is a distributed network, so that the computer readable code is stored/transferred and executed in a distributed fashion. Additional embodiments are equally available.

Thus, as described above, a method, medium, and apparatus controlling a bit rate in image data encoding, according to an embodiment of the present invention, makes it possible to create a bitstream having a fixed size for each frame.

Since the method, medium, and apparatus controlling a bit rate in image data encoding adjusts the amount of bits of each block group, e.g., each line, it increases the degree of freedom of the amount of bits assigned to each block.

The method, medium, and apparatus for controlling a bit rate in image data encoding also changes the amount of bits assigned to each block group according to a buffer state, thereby maintaining the amount of bits of a bitstream output from a buffer to a memory constant without adding a garbage bit to the bitstream.

Although a few embodiments of the present invention have been shown and described, it would be appreciated by those skilled in the art that changes are made in these exemplary embodiments without departing from the principles and spirit of the invention, the scope of which is defined in the claims and their equivalents.

Although a few embodiments of the present invention have been shown and described, it would be appreciated by those skilled in the art that changes are made in these embodiments without departing from the principles and spirit of the invention, the scope of which is defined in the claims and their equivalents.

What is claimed is:

1. A method for controlling a bit rate in image data encoding, the method comprising:

setting by a reference bit amount setting unit a reference bit amount for encoding a block group having a predetermined number of blocks created by dividing image data of a frame;

encoding by an encoding unit each of plural pixel values of the blocks according to a bit depth used to respectively quantize the pixel values of the blocks into a buffer;

determining by an encoding completion checking unit whether encoding of the frame is completed; and comparing by a bit depth adjustment controller a group bit amount indicating an amount of encoded bits of the block group with the set reference bit amount to adjust the bit depth if encoding of a unit frame is not completed and to accordingly repeat the setting of the reference bit amount for encoding the block group having the predetermined number of blocks created by dividing image data of the frame, wherein the bit depth, used in the respective quantization for pixel values of the block group, is distinguished from the amount of encoded bits of the block group.

2. The method of claim 1, wherein the repeating of the setting of the reference bit amount for encoding the block group having the predetermined number of blocks created by dividing image data of the frame further comprises the encoding of the pixel values of the blocks according to the bit depth used to quantize the pixel values of the blocks, and the determining of whether the encoding of the frame is completed.

3. The method of claim 1, wherein in the setting of the reference bit amount, the reference bit amount is set using $B_R=(B_S-B_C)/(G_S-G_C)$, where $B_R$ indicates the reference bit amount, $B_S$ indicates a total bit amount assigned to the frame, $B_C$ indicates an amount of encoded bits in the frame, $G_S$ indicates a total number of block groups making up the frame, and $G_C$ indicates a number of encoded block groups in the frame.

4. The method of claim 1, wherein the blocks are one-dimensional and the block group is a line.

5. The method of claim 1, wherein the encoding of the pixel values of the blocks comprises:
encoding pixel values of a block included in the blocks of the block group using the bit depth;
determining whether encoding of the block group is completed; and
adjusting the bit depth according to a bitstream storage state of a buffer that temporarily stores an encoded bitstream of the block group if encoding of the block group is not completed and accordingly repeating the encoding of the pixel values of the block included in the blocks of the block group using the bit depth, the determining of whether the encoding of the block group is completed, and the adjusting of the bit depth.

6. The method of claim 5, wherein the adjusting of the bit depth comprises:
determining whether an amount of bits stored in the buffer exceeds a threshold amount of the buffer; and
skipping encoding of a neighboring block of the block when the amount of bits stored in the buffer exceeds the threshold amount.

7. The method of claim 6, wherein the adjusting of the bit depth comprises:
determining whether the amount of bits stored in the buffer exceeds an upper allowable amount of the buffer when the amount of bits stored in the buffer does not exceed the threshold amount; and
reducing the bit depth when the amount of bits stored in the buffer exceeds the upper allowable amount.

8. The method of claim 7, wherein the adjusting of the bit depth comprises:
determining whether the amount of bits stored in the buffer is less than a lower allowable amount of the buffer when the amount of bits stored in the buffer does not exceed the upper allowable amount in the reducing of the bit depth when the amount of bits stored in the buffer exceeds the upper allowable amount; and
increasing the bit depth when the amount of bits stored in the buffer is less than the lower allowable amount.

9. The method of claim 1, wherein the comparing of the group bit amount indicating the amount of encoded bits of the block group with the set reference bit amount comprises:
determining whether the group bit amount exceeds the reference bit amount; and
reducing the bit depth when the group bit amount exceeds the reference bit amount.

10. The method of claim 9, wherein the comparing of the group bit amount indicating the amount of encoded bits of the block group with the set reference bit amount comprises:
determining whether a result of multiplying the group bit amount by a variable is less than the reference bit amount when the group bit amount does not exceed the reference bit amount in the reducing of the bit depth when the group bit amount exceeds the reference bit amount; and
increasing the bit depth when the result of the multiplication is less than the reference bit amount.

11. The method of claim 10, wherein the comparing of the group bit amount indicating the amount of encoded bits of the block group with the set reference bit amount comprises:
detecting a bitstream storage status of a buffer that temporarily stores an encoded bitstream of the block group; and
adjusting the variable according to the bitstream storage state of the buffer and accordingly repeating the determining of whether the group bit amount exceeds the reference bit amount.

12. The method of claim 11, wherein the comparing of the group bit amount indicating the amount of encoded bits of the block group with the set reference bit amount comprises:
adjusting the bit depth according to the bitstream storage state of the buffer after the adjusting of the variable according to the bitstream storage state of the buffer and accordingly repeating the determining of whether the group bit amount exceeds the reference bit amount.

13. An apparatus controlling a bit rate in image data encoding, the apparatus comprising:
an encoding unit to encode each of plural pixel values of blocks, created by dividing image data of a frame, according to a bit depth used for respective quantization of the pixel values of the blocks;
a buffer to temporarily store an encoded bitstream of the blocks;
a reference bit amount setting unit to set a reference bit amount for encoding a block group having a predetermined number of blocks;
an encoding completion checking unit to determine whether encoding of the frame is completed; and
a bit depth adjustment controller to compare a group bit amount indicating an amount of encoded bits of the block group with the set reference bit amount, in response to the determination result of the encoding completion checking unit, and to accordingly adjust the bit depth,
wherein the bit depth, used in the respective quantization for pixel values of the block group, is distinguished from the amount of encoded bits of the block group.

14. The apparatus of claim 13, wherein the reference bit amount setting unit sets the reference bit amount using $B_R=(B_S-B_C)/(G_S-G_C)$,
where $B_R$ indicates the reference bit amount, $B_S$ indicates a total bit amount assigned to the frame, $B_C$ indicates an amount of encoded bits in the frame, $G_S$ indicates a total number of block groups making up the frame, and $G_C$ indicates a number of encoded block groups in the frame.

15. The apparatus of claim 13, wherein the blocks are one-dimensional and the block group is a line.

16. The apparatus of claim 13, wherein the encoding completion checking unit determines whether encoding of the block group is completed.

17. The apparatus of claim 13, wherein the bit depth adjustment controller comprises:
- a bit amount comparing unit to compare the group bit amount with the reference bit amount to determine whether the group bit amount exceeds the reference bit amount; and
- a bit depth adjusting unit to adjust the bit depth based on a result of the comparison performed by the bit amount comparing unit.

18. The apparatus of claim 17, wherein the bit depth adjustment controller further comprises:
- a buffer bit amount detecting unit to detect an amount of bits stored in the buffer; and
- a variable adjusting unit to adjust a variable by which a group bit amount is to be multiplied based on a result of the detection performed by the buffer bit amount detecting unit.

19. The apparatus of claim 18, wherein the bit depth adjusting unit adjusts the bit depth based on the result of the detection performed by the buffer bit amount detecting unit.

20. The apparatus of claim 13, wherein the bit depth adjustment controller adjusts the bit depth according to a bitstream storage state of the buffer.

21. The apparatus of claim 20, wherein the bit depth adjustment controller comprises:
- a buffer bit amount detecting unit to detect an amount of bits stored in the buffer;
- an encoding skip instructing unit to instruct the encoding unit to skip encoding of a neighboring block of a current block upon receiving the detection result, indicating the amount of bits stored in the buffer exceeds a threshold amount of the buffer, from the buffer bit amount detecting unit; and
- a bit depth adjusting unit to reduce the bit depth upon receiving the detection result, indicating the amount of bits stored in the buffer exceeds an upper allowable amount of the buffer, from the buffer bit amount detecting unit, and to increase the bit depth upon receiving the detection result indicating the amount of bits stored in the buffer is less than a lower allowable amount of the buffer.

22. At least one non-transitory computer readable medium comprising computer readable code to implement the method of claim 1.

23. At least one non-transitory computer readable medium comprising computer readable code to implement the method of claim 3.

24. A method for controlling a bit rate in image data encoding, the method comprising:
- setting a reference bit amount for encoding a block group having a predetermined number of blocks created by dividing image data of a frame;
- encoding each of plural pixel values of the blocks according to a bit depth used to respectively quantize the pixel values of the blocks into a buffer memory; and
- comparing, during encoding of the frame, a group bit amount indicating an amount of encoded bits of the block group with the set reference bit amount to adjust the bit depth, wherein the bit depth, used in the respective quantization of pixel values of the block group, is distinguished from the amount of encoded bits of the block group.

* * * * *